United States Patent
Paisley

(10) Patent No.: US 10,872,371 B2
(45) Date of Patent: Dec. 22, 2020

(54) TECHNIQUES FOR PACKAGE BUNDLING AND INTERFACES

(71) Applicant: NCR Corporation, Atlanta, GA (US)

(72) Inventor: Dennis Lyle Paisley, Johns Creek, GA (US)

(73) Assignee: NCR Corporation, Atlanta, GA (US)

( * ) Notice: Subject to any disclaimer, the term of this patent is extended or adjusted under 35 U.S.C. 154(b) by 190 days.

(21) Appl. No.: 16/049,155

(22) Filed: Jul. 30, 2018

(65) Prior Publication Data

US 2020/0034915 A1    Jan. 30, 2020

(51) Int. Cl.
*G06Q 30/06* (2012.01)
*H04W 4/021* (2018.01)
*G06K 7/14* (2006.01)
*G06K 7/10* (2006.01)

(52) U.S. Cl.
CPC ....... *G06Q 30/0635* (2013.01); *G06K 7/1417* (2013.01); *G06Q 30/0631* (2013.01); *G06Q 30/0641* (2013.01); *H04W 4/021* (2013.01); *G06K 2007/10524* (2013.01)

(58) Field of Classification Search
CPC .............. G06Q 30/06; G06Q 30/0635; G06Q 30/0631; G06Q 30/0641; G06K 2007/10524; H04W 4/021
USPC ........................ 705/26.81, 27.1, 26.7, 26.1
See application file for complete search history.

(56) References Cited

U.S. PATENT DOCUMENTS

| | | | |
|---|---|---|---|
| 8,265,256 B1 * | 9/2012 | Croak | G06Q 30/06 370/352 |
| 10,445,807 B1 * | 10/2019 | Commons | G06Q 30/0623 |
| 10,580,026 B2 * | 3/2020 | Levy | G06Q 30/00 |
| 2012/0095844 A1 * | 4/2012 | Barnes, Jr. | G06Q 20/322 705/14.69 |
| 2012/0307645 A1 * | 12/2012 | Grosman | H04W 4/021 370/241 |
| 2013/0134213 A1 * | 5/2013 | Pallakoff | G06Q 30/00 235/375 |
| 2013/0332317 A1 * | 12/2013 | Boncyk | G06K 9/3241 705/26.62 |
| 2016/0063588 A1 * | 3/2016 | Gadre | G06F 16/9537 705/26.61 |
| 2016/0078522 A1 * | 3/2016 | Sakazume | G06Q 30/0641 705/14.73 |
| 2016/0249088 A1 * | 8/2016 | Binder | H04N 21/6587 |
| 2020/0037101 A1 * | 1/2020 | Lyman | H04L 67/34 |

FOREIGN PATENT DOCUMENTS

EP         2704068 A1 *  3/2014  ......... G06Q 10/0833

* cited by examiner

Primary Examiner — Yogesh C Garg
(74) Attorney, Agent, or Firm — Schwegman, Lundberg & Woessner

(57) ABSTRACT

An operating-facing interface is provided with a mobile application for scanning a product code of a product. The product code is processed to generate a product package bundle that includes the product code and a plurality of other product codes that identify compatible products that have a relationship to the product. The operating-facing interface provides options for obtaining product information regarding the compatible products from the application.

12 Claims, 4 Drawing Sheets

TECHNIQUES FOR PACKAGE BUNDLING AND INTERFACES

BACKGROUND

Increasingly retailers are deploying technology to automate the shopping experience. Routinely, consumers can now user their mobile devices to purchase items and perform self-checkouts from stores. Even with these advancements, consumers are purchasing less in brick-and-mortar stores; rather, consumers are using physical stores as showcases to try out (look, feel, and operation of) products, which the consumer then subsequently purchases online outside of the store. This is having significant impacts on the revenues and continued viability of brick-and-mortar stores. Every year long-established retailers are closing physical stores as a result of this troubling trend.

Even when a retailer is successful in getting a consumer to make a purchase within a store or through the retailer online, the retailer often misses many additional sale opportunities related to such a sale. Often, this is because the product purchased: requires, is compatible with, or is known to compliment one or more additional products for which the consumer has no knowledge of.

For example, laptops now include different faster Universal Serial Bus (USB) ports that are different sized connections from existing USB devices of the consumer, such that an adapter cord is needed to permit the consumer to continue using the existing USB devices with such laptops. As another example, many consumer devices now support interaction with other devices; a SAMSUNG® refrigerator can cast the video provided on a SAMSUNG® television on a screen of the refrigerator, but the refrigerator is not compatible with other brands of televisions. An apparel selection may be known to aesthetically compliment certain other accessories; a dress of a certain design may have a belt and shoes that were specifically designed for that dress.

Retailers try to make complimentary product bundles known to consumers through advertising and/or in-store signage but the degree of success in assuring that the consumer receives such information is spotty and many consumers complain that such information is not readily available. Furthermore, when a consumer makes a purchase of a product that is not compatible with another purchased product of the consumer, the consumer is likely to return such product and may even also return the purchased product, which effects revenues of the retailer.

Accordingly, there is a need for improved techniques and interfaces for providing product compatibility to consumers.

SUMMARY

In various embodiments, methods and a system for package bundling and interfaces are presented.

According to an embodiment, a method for package bundling and interfaces is presented. Specifically, and in one embodiment, a product code for a product is scanned and the product code is provided to a product packaging manager. A product package is received, the product package including a plurality of additional product codes for additional products that were identified by the product packaging manager has having relationships to the product. The product package is presented in an interface for interaction.

DETAILED DESCRIPTION

Figure 1:
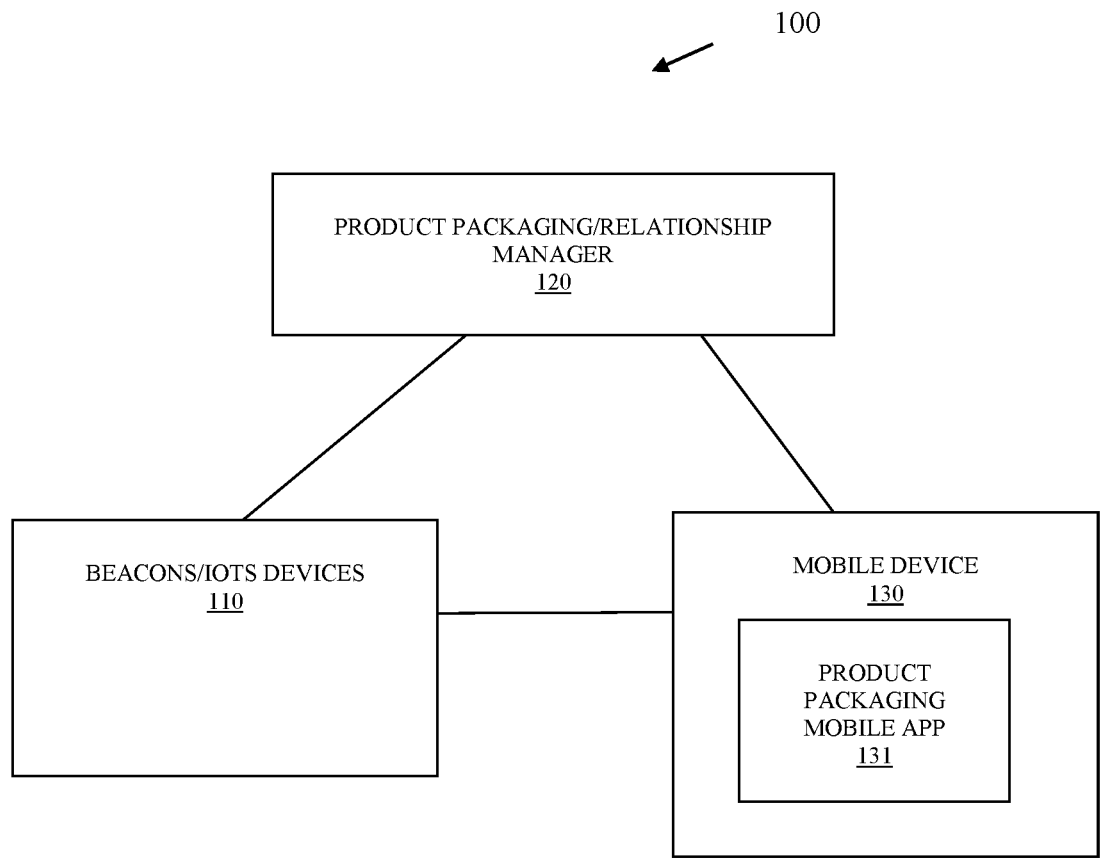
FIG. 1 is a diagram of a system for package bundling and interfaces, according to an example embodiment.

FIG. 1 is a diagram of a system 100 for package bundling and interfaces, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of package bundling and interface processing, presented herein and below.

The system 100 includes: a plurality of wireless beacons and/or Internet-of-Things (IoTs) devices 110, a product packaging/relationship manager (manager) 120, and at least one mobile device 130 having a product packaging mobile application (app) 131.

As used herein the terms "consumer" and "customer" may be used interchangeably and synonymously.

Initially, a consumer or an attendant of a retail store downloads and obtains the app 131. In an embodiment, the consumer uses the mobile device 130 to scan a Quick Response (QR) code displayed within the store, which causes the mobile device 130 to download and install the app 131 on the consumer's device. In an embodiment, the app 131 is an existing retailer app that the consumer has previously acquired for the retailer on the mobile device 130 and is enhanced with the processing discussed herein and below as the app 131.

When a consumer, is interested in a particular product and its related products, the consumer opens the app 131 and is presented with a user-facing interface that allows the consumer to scan an item's barcode using the integrated camera of the mobile device 130. When the consumer scans a particular product barcode through the interface, the app 131 sends the barcoded image to the manager 120. The manager 120 maintains a database of related products or products that have a relationship to the scanned product that is obtainable by searching on the product identifier for a product that is encoded in the barcoded image for the barcode of the product.

The manager 120 then returns product (item) descriptions, item details, and/or item pricing for each item that is compatible and/or has a known relationship to the scanned product barcode. This related product information is provided to the user-facing interface of the app 131 and presented on the display of the mobile device 130 to the consumer while the consumer is in the store and situated in front of or proximate to the scanned product.

In an embodiment, the additional compatible products returned also include location information that when clicked by the consumer inside the user-facing interface of the app 131 provides detailed in-store location information for the consumer to locate each additional compatible product within the store.

In an embodiment, if a particular additional compatible product is not available in inventory but can be obtained at a different store location from inventor, such information is provided in the user-facing interface of the app 131.

In an embodiment, if a particular additional compatible product is only available through an online purchase, the user-facing interface provides interface screens that permit the consumer to order such product through the app 131 with the retailer.

The manager 120 maintains separately the scanned product, the related products returned, a consumer identifier for the consumer, a store location for the store, a date, and a time as a product package assigned to the product and the customer.

In an embodiment, the app 131 also maintains the product package on the mobile device 130 but viewing or interacting with the package can only be achieved through the app 131.

The consumer can subsequently (after an initial store visit in which the consumer scanned a product barcode and after the product package was created) access the app 131 and view the package.

In an embodiment, the package may only be viewed through the app 131 when the app 131 detects a mobile device location for the mobile device as being within the store where the product barcode associated with creating the product package was initially scanned by the consumer. That is, the app 131 uses location services of the device 130 to compare a current location of the device 130 against a known location of the store and if the device 130 is not within the store or within a configured geographical proximity to the store, the link that activates the product package for viewing within the app 131 is deactivated and unable to be accessed and viewed by the consumer through the user-facing interface of the app 131. That is, access to recalling, viewing, and interacting with the product package is geofenced, such that is can only be accessed when the consumer is at the store. This deters the consumer from using the products identified in the product package for purchases with a different retailer than the retailer that created the product package.

In an embodiment, the geofenced access discussed in the latter embodiment is enhanced to permit access to the product package on the app 131 whenever a current location of the consumer is detected as being at a store location associated with the retailer. That is, a different store location from the original store location where the product package was created can be used to permit the consumer access to the product package through the user-facing interface. Here, the app 131 is preconfigured to recognize the store locations of the retailer and unlock access to the product package whenever the current location of the device 130 is within a configured geographical proximity to any of the retailer's stores.

In an embodiment, a change is made to the Operating System (OS) of the device 130, so as to prevent any OS-command that takes a screen image for any screens rendered by the app 131. That is, when the app 131 is in focus and being processed within the OS of the device 130, the OS ignores and does recognize a consumer-initiated OS command to capture a screen shot of the display for the device 130. This is another mechanism for deterring the consumer from being able to use the product package at a later time for purchasing any of the products associated with the product package from a different retailer from the retailer that created the product package.

In an embodiment, the product package produced by the manager 120 includes: an identifier and description of the initial scanned product that was used for generating the package, identifiers and descriptions for each of the related products that are compatible with and have a relationship to the scanned product, links that when accessed provided additional details and/or pricing for the scanned product and the compatible products, and/or links to any promotions available to the consumer for the scanned product and/or the compatible products being provided by the retailer.

In an embodiment, the manager 120 maintains metadata with the product package, the metadata including: a consumer identifier, a unique product package identifier for the package, a date and time that the product package was created by the manager 120, a store location and store identifier for the store where the product package was created, and a retailer identifier for the retailer associated with the store location.

In an embodiment, the system 100 includes beacons or IoTs devices 110 that facilitate identifying the specific location of device 130 within the store. This can be done by low-energy Bluetooth® beacons 110 that have known geographical locations with the store and transmit their identifiers, which are detected by the app 131 and sent by the app 131 along with a mobile device identifier for the device 130 to the manager 120. This can also be done by IoTs devices 110 that obtain the mobile device identifier for the device 130 from the app 131 and send the mobile device identifier along with a current geographical location identified by the IoT device 110 to the manager 120.

In an embodiment, the system 100 does not require any beacons or IoT devices 110 for operation (as was discussed in some of the embodiments above, such as when the app 131 provides location information directly to the manager 120).

In an embodiment, the mobile device includes one or more of: a tablet, a phone, a laptop, and a wearable processing device.

In an embodiment, the mobile device 130 is operated by an attendant within the store on behalf of the consumer, in this case the attendant can create the package on behalf of the consumer. Once created for the consumer, an instance of the app 131 available on a device 130 of the consumer can access the package independent of the attendant. In an embodiment, the consumer initiates creation of the package on the consumer's device 130 through the app 131 and the manager 120, and the attendant having a different device 130 and instance of app 131 can obtain the package from the manager 120 by entering a customer identifier or using the app 131 to scan or manually enter a customer loyalty number from a loyalty card. In this way, the app 131 may provide an enhanced user-facing interface to attendants that are not available in the apps 131 that process on consumer devices 130, such enhanced interface may provide options for the attendants to recall and obtain consumer-created packages based on consumer identifiers (loyalty accounts). Such different attendant user-facing interface to the app 131 may also provide options for the attendant to access the consumer's transaction history with the retailer, consumer preferences with the retailer, and loyalty account all of which can assist the attendant in servicing the consumer within the store.

In an embodiment, the mobile device is entirely operated by the consumer without any attendant assistance.

These and other embodiments are now discussed with reference to the FIGS. 2-4.

Figure 2:
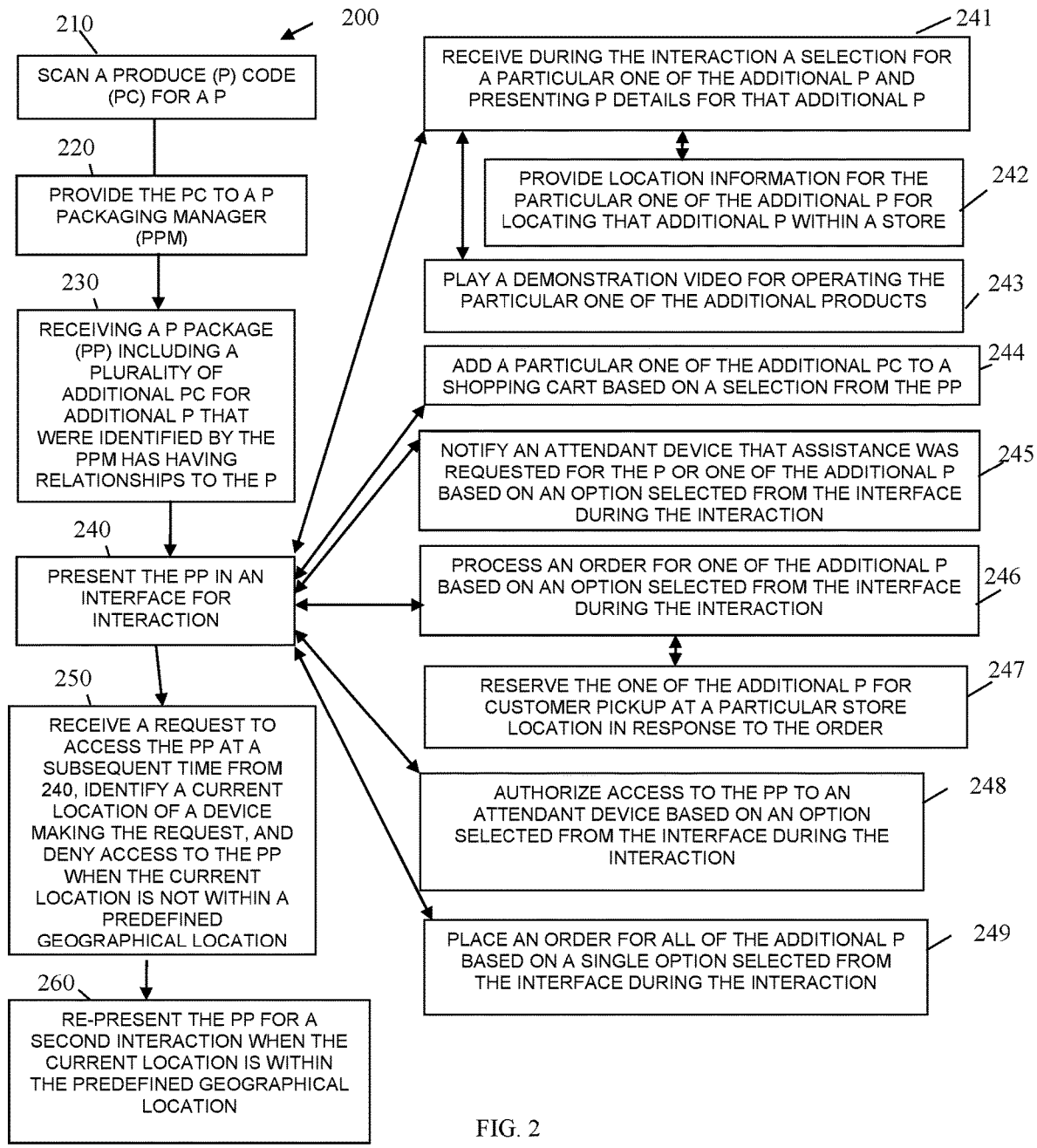
FIG. 2 is a diagram of a method for package bundling and interfaces, according to an example embodiment.

FIG. 2 is a diagram of a method 200 for package bundling and interfaces, according to an example embodiment. The software module(s) that implements the method 200 is referred to as a "product package bundle application (app)." The product package bundle app is implemented as executable instructions programmed and residing within memory and/or a non-transitory computer-readable (processor-readable) storage medium and executed by one or more processors of a device. The processor(s) of the device that executes the product package bundle app are specifically configured and programmed to process the product package bundle app. The product package bundle app has access to one or more network connections during its processing. The network connections can be wired, wireless, or a combination of wired and wireless.

In an embodiment, the device that executes the product package bundle app is the mobile device 130. In an embodiment, the mobile device 130 is one of: a phone, a laptop, a tablet, and a wearable processing device.

In an embodiment, the product package bundle app is the app 131.

At 210, the product package bundle app scans a product code for a product. This can be done through a camera integrated into the mobile device that executes the product package bundle app. The user-facing interface of the product package bundle app may also permit product codes that cannot be scanned for whatever reason to be entered manually.

At 220, the product package bundle app provides the product code to a product packaging manager. In an embodiment, the product packaging manager is the manager 120.

At 230, the product package bundle app receives a product package including a plurality of additional product codes for additional products that were identified by the product packaging manager has having relationships to the product.

At 240, the product package bundle app presents the product package in an interface for interaction.

In an embodiment, at 241, the product package bundle app receives during the interaction a selection for a particular one of the additional products and presenting product details for that additional product.

In an embodiment of 241, at 242, the product package bundle app provides location information for the particular one of the additional products for locating that additional product within a store. That is, specific location information and/or directions to obtain that particular product is provided through the user-facing interface based on the selection.

In an embodiment of 241, at 243, the product package bundle app plays a demonstration video for operating the particular one of the additional products.

In an embodiment, at 244, the product package bundle app adds a particular additional product code to a shopping cart based on a selection received during the interface from the product package. That is, the user-facing interface permits customer purchasing transaction operations.

In an embodiment, at 245, the product package bundle app notifies an attendant device that assistance was requested for the product or one of the additional products based on an option selected from the interface during the interaction.

In an embodiment, at 246, the product package bundle app processes an order for one of the additional products based on an option selected from the interface during the interaction.

In an embodiment of 246, at 247, the product package bundle app reserves the one of the additional products for customer pickup at a particular store location in response to the order.

In an embodiment, at 248, the product package bundle app authorizes access to the product package to an attendant device based on an option selected from the interface during the interaction. That is, a consumer can control access to the product package and may interactively grant such access to an attendant associated with the attendant device.

In an embodiment, at 249, the product package bundle app places an order for all of the additional products based on a single option selected from the interface during the interaction. The user-facing interface supports purchasing all of the products in the package through a single-click made of an option provided in the user-facing interface.

In an embodiment, at 250, the product package bundle app receives a request to access the product package at a subsequent time from 240. The product package bundle app identifies a current location of a device (the mobile device that is executing the product package bundle app) making the request. The product package bundle app denies access to the product package when the current location is not within a predefined geographical location. Access to the product package is geofenced by the product package bundle app.

In an embodiment of 250 and at 260, the product package bundle app represents the product package for a second interaction when the current location is within the predefined geographical location. That is, access is provided to the product package only when the mobile device is within or proximate to a predefined geographical location.

Figure 3:
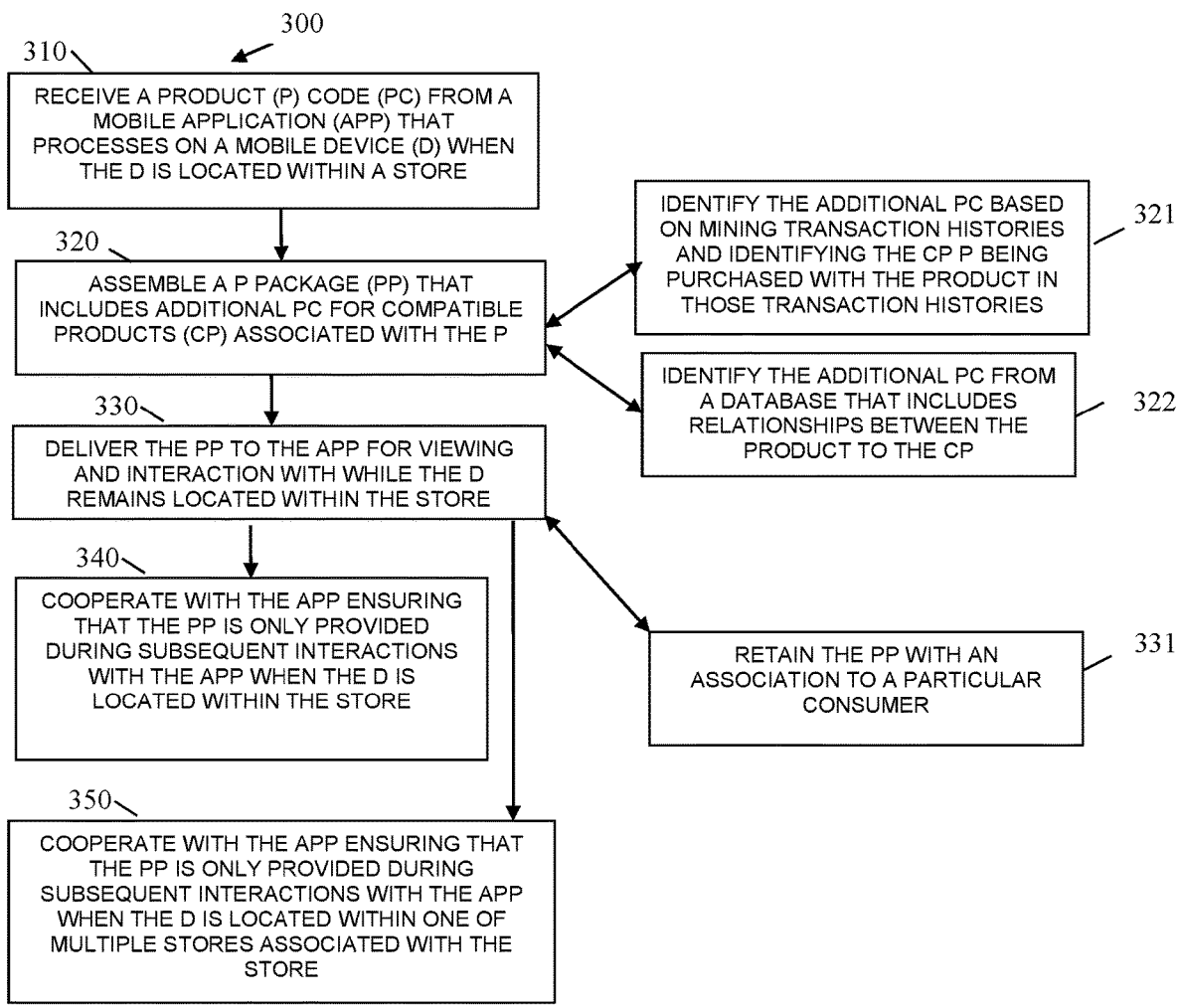
FIG. 3 is a diagram of another method for package bundling and interfaces, according to an example embodiment.

FIG. 3 is a diagram of another method 300 for package bundling and interfaces, according to an example embodiment. The software module(s) that implements the method 300 is referred to as a "product package manager." The product package manager is implemented as executable instructions programmed and residing within memory and/or a non-transitory computer-readable (processor-readable) storage medium and executed by one or more processors of a device. The processors that execute the product package manager are specifically configured and programmed to process the product package manager. The product package manager has access to one or more network connections during its processing. The network connections can be wired, wireless, or a combination of wired and wireless.

In an embodiment, the device that executes the product package manager is a server. In an embodiment, the server is a cloud processing environment that comprises multiple servers cooperating with one another as a single server. In an embodiment, the server is a LAN server that is local to a retail store.

In an embodiment, the device that executes the product package manager is a network-edge device that is on the edge of a LAN for a retail store.

In an embodiment, the product package manager is the manager 120.

The product package manager interacts over a wireless network connection with the method 200.

At 310, the product package manager receives a product code from a mobile application that processes on a mobile device when the mobile device is located within a store.

At 320, the product package manager assembles a product package that includes additional product codes for compatible products associated with the product.

In an embodiment, at 321, the product package manager identifies the additional product codes based on mining transaction histories and identifying the compatible products being purchased with the product in those transaction histories.

In an embodiment, at 322, the product package manager identifies the additional product code from a database that includes relationships between the product to the compatible products.

At 330, the product package manager delivers the product package to the mobile application for viewing and interaction with while the mobile device remains located within the store.

In an embodiment, at 331, the product package manager retains the product package with an association to a particular consumer.

In an embodiment, at 340, the product package manager cooperates with the mobile application ensuring that the product package is only provided during subsequent interactions with the mobile application when the mobile device is located within the store.

In an embodiment, at 350, the product package manager cooperates with the mobile application ensuring that the product package is only provided during subsequent interactions with the mobile application when the mobile device is located within one of multiple stores associated with the store.

Figure 4:
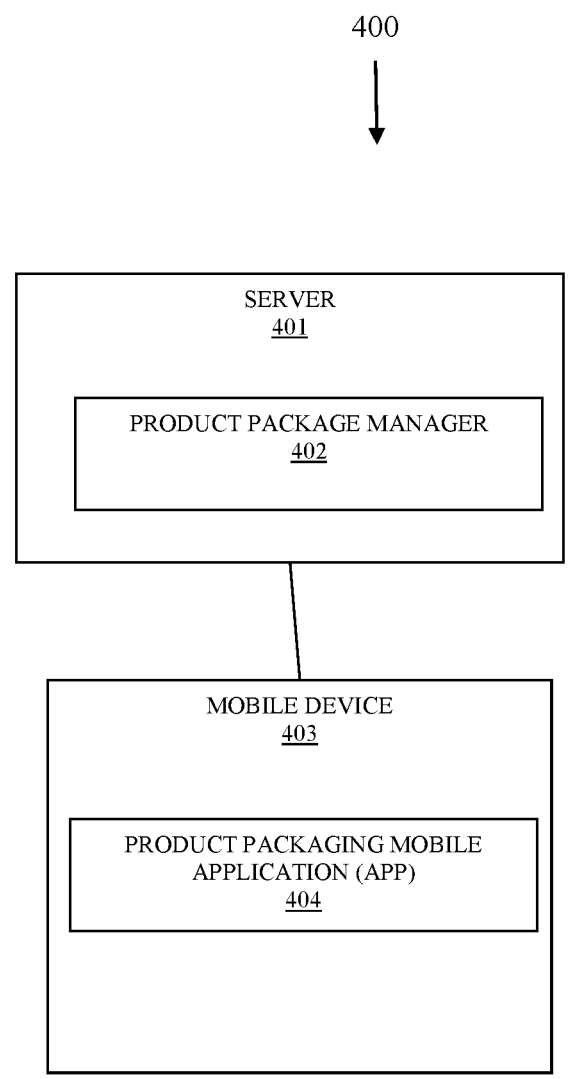
FIG. 4 is a diagram of a system for package bundling and interfaces, according to an example embodiment.

FIG. 4 is a diagram of a system 400 for package bundling and interfaces, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 is the system 100.

The system 400 includes a server 401 having a product package manager 402 and a mobile device 403 having a product packaging mobile application (app) 404.

In an embodiment, the server 401 is a collection of servers that cooperate as a cloud processing environment.

In an embodiment, the server 401 is a network edge device.

In an embodiment, the mobile device is the mobile device 130. In an embodiment, the mobile device 130 is one of: a phone, a tablet, a laptop, and a wearable processing device.

In an embodiment, the product package manager 402 is all or some combination of: the manager 120 and/or the method 300.

In an embodiment, the product packaging mobile app 404 is all or some combination of: the app 131 and/or the method 200.

The product package manager 402 and the product packaging mobile app 404 are sets of executable instructions that is executed on one or more hardware processors of the server 401 and the mobile device 403 from non-transitory computer-readable storage mediums or memories.

The product package manager 402 is configured to: i) receive a product code provided by the mobile app 404 for a product, ii) generate a product package that includes additional product codes for additional products that are identified as being compatible to the product, and ii) deliver the product package to the mobile app 404.

The mobile app 404 is configured to: i) provide the product code to the product package manager 402 from an interface of the mobile app 404 when the mobile device 403 is located within a store, ii) receive the product package from the product package manager 402 in response to providing the product code, and iii) present the product package within the interface for interaction when the mobile device 403 is located within the store.

In an embodiment, the product package manager 402 and the mobile app 404 are further configured to cooperate with one another to ensure that the product package is only available within the interface when the mobile device 402 is located within the store or located within another store that is associated with the store. Here, access to the product package is geofenced through cooperation between the product package manager 402 and the mobile app 404.

It is to be noted that although the various examples presented were within the context of online middleware food service providers, other embodiments of the invention are not so limited, such that any retailer middleware service that sells products other than food can benefit from the teachings presented herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
via a hardware processor of a mobile device performing;
scanning a product code for a product by a camera integrated into the mobile device and obtaining the product code;
obtaining a current location of the mobile device when the scanning of the product code was processed;
providing the product code and the current location to a product packaging manager over a wireless network connection;
receiving a product package comprising a plurality of additional product codes for additional products that were identified by the product packaging manager as having relationships to the product, links that when accessed provide additional details and pricing for the product code and the additional product codes, and additional links to promotions associated with product and the additional products, wherein receiving further includes receiving metadata with the product package, the metadata comprising a consumer identifier for a consumer that is operating the mobile device, a unique product package identifier for the product package, a date and time that the product packaging manager created the product package, a store location for a store associated with the current location, a store identifier for the store, and a retailer identifier for a retailer associated with the store location;

geofencing access to the product package through an interface provided on the mobile device by preventing access to the product package through the interface on the mobile device unless an updated current location for the mobile device is within a configured geographic proximity of the store location or the updated current location for the mobile device is within the configured geographic proximity of additional store locations for additional stores of the retailer based on the retailer identifier and based on the metadata; and presenting the product package in the an interface for interaction with the links and the additional links based on the geofencing.

2. The method of claim 1 further comprising, receiving a request to access the product package through the interface at a subsequent time from the presenting, identifying an updated current location of the mobile device, and denying access to the product package when the current location is not within the configured geographic proximity of the store location or the additional store locations.

3. The method of claim 2 further comprising, providing the product package through the interface on the mobile device for a second interaction when the updated current location is within the configured geographic proximity of the store location or the additional store locations.

4. The method of claim 1, wherein presenting further includes receiving during the interaction a selection of a particular additional link for a particular one of the additional products, obtaining through the additional link product details for the corresponding additional product, and presenting the product details through the interface on the mobile device.

5. The method of claim 4, wherein receiving further includes providing location information for the corresponding additional product through the interface on the mobile device to locate the corresponding additional product within the store or a particular one of the additional stores based on an updated current location of the mobile device.

6. The method of claim 4, wherein receiving further includes playing a demonstration video through the interface on the mobile device for operating the corresponding additional product.

7. The method of claim 1, wherein presenting further includes adding a particular additional product code to a shopping cart based on a selection received during the interaction with the product package within the interface.

8. The method of claim 1, wherein presenting further includes notifying an attendant device that assistance was requested for the product or one of the additional products based on an option selected from the interface during the interaction.

9. The method of claim 1, wherein presenting further includes processing an order for one of the additional products based on an option selected from the interface during the interaction.

10. The method of claim 9, wherein processing further includes reserving the one of the additional products for customer pickup at a particular store location in response to the order.

11. The method of claim 1, wherein presenting further includes authorizing access to the product package to an attendant device based on an option selected from the interface during the interaction.

12. The method of claim 11, wherein presenting further includes placing an order for all of the additional products based on a single option selected from the interface during the interaction.

* * * * *